(12) United States Patent
Cavalier et al.

(10) Patent No.: US 8,118,254 B2
(45) Date of Patent: Feb. 21, 2012

(54) FLAP ACTUATOR

(75) Inventors: Don R. Cavalier, Walker, MI (US); Aaron M. Klap, Grand Rapids, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/029,479

(22) Filed: Feb. 17, 2011

(65) Prior Publication Data

US 2012/0012697 A1 Jan. 19, 2012

Related U.S. Application Data

(62) Division of application No. 12/648,767, filed on Dec. 29, 2009, now Pat. No. 7,954,756, which is a division of application No. 11/458,001, filed on Jul. 17, 2006, now Pat. No. 7,690,597.

(51) Int. Cl.
  *B64C 3/38* (2006.01)
  *B64C 5/10* (2006.01)
  *B64C 9/00* (2006.01)
  *B64C 13/00* (2006.01)

(52) U.S. Cl. .................. 244/99.2; 244/213; 244/215

(58) Field of Classification Search ............... 244/99.2, 244/213, 215, 216; 74/89.38, 89.39
See application file for complete search history.

(56) References Cited

U.S. PATENT DOCUMENTS

| | | | | |
|---|---|---|---|---|
| 3,401,777 A * | 9/1968 | Williams | ................ | 192/223.3 |
| 3,448,840 A * | 6/1969 | Rosin | ................ | 192/223 |
| 3,643,589 A * | 2/1972 | Carter | ................ | 100/49 |
| 3,802,281 A * | 4/1974 | Clarke | ................ | 74/89.39 |
| 4,745,815 A * | 5/1988 | Klopfenstein | ................ | 74/89.25 |
| 4,834,225 A * | 5/1989 | Klopfenstein et al. | ................ | 192/223 |
| 5,195,721 A * | 3/1993 | Akkerman | ................ | 251/129.13 |
| 5,582,390 A * | 12/1996 | Russ | ................ | 244/99.2 |
| 5,655,636 A * | 8/1997 | Lang et al. | ................ | 192/223 |
| 5,743,490 A * | 4/1998 | Gillingham et al. | ................ | 244/99.9 |
| 5,944,148 A * | 8/1999 | Bae et al. | ................ | 188/134 |
| 6,109,415 A * | 8/2000 | Morgan et al. | ................ | 192/223.1 |
| 6,240,797 B1 | 6/2001 | Morishima et al. | | |
| 6,672,540 B1 * | 1/2004 | Shaheen et al. | ................ | 244/99.3 |

FOREIGN PATENT DOCUMENTS

| | | |
|---|---|---|
| EP | 1426290 | 6/2004 |
| FR | 2858035 | 1/2005 |
| GB | 675606 | 7/1952 |

* cited by examiner

*Primary Examiner* — Timothy D Collins
*Assistant Examiner* — Philip J Bonzell
(74) *Attorney, Agent, or Firm* — Boyle Fredrickson, s.c.

(57) ABSTRACT

A flap actuator is provided for controlling movement of a flap on a wing of an aircraft. The flap actuator includes a housing having a leading end and a trailing end. A ball nut is rotatably supported in the housing. A motor has a rotatable drive shaft that is rotatable in first and second opposite directions. A gear assembly translates rotation of the drive shaft to the ball nut. A ball screw extends along a longitudinal axis and has a terminal end operatively connectable to the flap. The ball screw is movable between a first retracted in response to rotation of the ball nut in a first direction and a second extended position in response to rotation of the ball nut in a second direction. A one-way roller clutch is operatively connectable to the ball nut. The roller clutch engages the housing and prevents rotation of the ball nut in a first direction in response to a compressive force on the ball screw by the flap. First and second concentric gimbals are positioned about the longitudinal axis adjacent the housing. The gimbals interconnect the housing to the wing.

5 Claims, 4 Drawing Sheets

FLAP ACTUATOR

CROSS-REFERENCE TO RELATED APPLICATION

This application is a divisional of application Ser. No. 12/648,767 filed Dec. 29, 2009 now U.S. Pat. No. 7,954,756, which is a divisional of application Ser. No. 11/458,001 filed Jul. 17, 2006 now U.S. Pat. No. 7,690,597.

FIELD OF THE INVENTION

This invention relates generally to aircrafts, and in particular, to a flap actuator for controlling operation of a flap on the wing of an aircraft.

BACKGROUND AND SUMMARY OF THE INVENTION

The maneuverability of an aircraft depends heavily on the movement of hinged sections or flaps located at the trailing edges of the wings. By selectively extending and retracting the flaps, the aerodynamic flow conditions of the wings may be influenced so as to increase or decrease the lift generated by the wings. For example, during the take-off and landing phases of a flight, the position of the flaps of the aircraft are adjusted to optimize the lift and drag characteristics of the wing. It can be appreciated the reliable operation of the flaps is of critical importance to an aircraft.

In large aircraft, a series of flaps are provided on the trailing edge of each wing. The flaps are raised and lowered in a conventional manner by a hydraulically actuated linkage of bell cranks, pushrods, and idlers. A flap control lever is provided in the cockpit of the aircraft to control the system mechanically. The flap control lever is connected by conventional and teleflex cables to a hydraulic actuating mechanism. As is known, these hydraulic actuating mechanisms utilize large centralized pumps to maintain pressure hydraulic pressure within the system. Hydraulic lines distribute the hydraulic fluid under pressure to corresponding flap actuators. In order to insure the reliability of the system, multiple hydraulic lines are run to each flap actuator.

While functional for their intended purposes, these prior hydraulic systems have certain inherent problems. For example, it is highly desirable for all systems on an aircraft to be easily serviceable so that departure of the aircraft will not be delayed while mechanics attempt to diagnose and repair the aircraft. However, given the complexity of the pumps and the lines in the hydraulic system of the aircraft, it is often relatively difficult and costly to diagnose and/or repair the hydraulic system. Further, the use of multiple hydraulic lines must be run to each flap actuator to ensure redundancy in the system is costly, both in terms of weight and money. Hence, it is highly desirable to provide a redundant, flap actuator control system that is simple to install and service and this is lightweight.

Therefore, it is a primary object and feature of the present invention to provide a flap actuator that is simple to install and service.

It is a further object and feature of the present invention to provide a flap actuator that incorporates redundant load path design.

It is a still further object and feature of the present invention to provide a flap actuator that maintains the position of a flap of an aircraft in response to a compression load thereon by the flap.

In accordance with the present invention, a flap actuator is provided for controlling movement of a flap on a wing of an aircraft. The flap actuator includes a shaft extending along a longitudinal axis and having a terminal end operatively connectable to the flap. The shaft is movable between a first retracted position and a second extended position. A no-back assembly is operatively connectable to the shaft. The no-back assembly prevents movement of the shaft toward the retracted position in response to a compressive force generated by the flap.

The no-back assembly includes a housing for supporting the shaft and a first gimbal for interconnecting the housing to the wing. A second gimbal also interconnects the housing to the wing. First and second pins extend between the housing and the first gimbal, and interconnect the second gimbal to the first gimbal and the housing. A mounting pin extends through the first gimbal and is operatively connectable to the wing.

The flap actuator also includes a ball nut engageable with the shaft and rotatable about the longitudinal axis. Rotation of the ball nut in a first direction causes the shaft to move toward the extended position, while rotation of the ball nut in a second direction causes the shaft to move toward the retracted position. The shaft includes a hollow ball screw extending along the longitudinal axis and an inner bar extending through the ball screw. A motor having a rotatable drive shaft is also provided. The drive shaft is rotatable in first and second opposite directions. A gear assembly translates rotation of the drive shaft to the ball nut. The gear assembly includes a clutch. The clutch disengages the drive shaft from the ball nut in response to a predetermined force thereon.

In accordance with a further aspect of the present invention, a flap actuator is provided for controlling movement of a flap on a wing of an aircraft. The flap actuator includes a housing having a leading end and a trailing end. A ball nut is rotatably supported in the housing. A ball screw extends along a longitudinal axis and has a terminal end operatively connectable to the flap. The ball screw movable between a first retracted position and a second extended position in response to rotation of the ball nut. A one-way roller clutch is operatively connectable to the ball nut. The roller clutch engages the housing and prevents rotation of the ball nut in a first direction in response to a compressive force on the ball screw by the flap. A gimbal assembly is connected to the housing and is connectable to the wing.

The gimbal assembly includes a first gimbal for interconnecting the housing to the wing and a second gimbal for interconnecting the housing to the wing. First and second pins extending between the housing and the first gimbal. In addition, the first and second pins interconnect the second gimbal to the first gimbal and the housing. The gimbal assembly also includes a mounting pin extending through the first gimbal and being operatively connectable to the wing.

Rotation of the ball nut in a first direction causes the ball screw to move toward the extended position. Rotation of the ball nut in a second direction causes the ball screw to move toward the retracted position. A motor having a rotatable drive shaft is provided. The drive shaft is rotatable in first and second opposite directions. A gear assembly translates rotation of the drive shaft to the ball nut. The gear assembly includes a clutch that disengages the drive shaft from the ball nut in response to a predetermined force thereon. An inner bar extends through the ball screw.

In accordance with a still further aspect of the present invention, a flap actuator is provided for controlling movement of a flap on a wing of an aircraft. The flap actuator includes a housing having a leading end and a trailing end. A ball nut is rotatably supported in the housing. A motor has a rotatable drive shaft that is rotatable in first and second opposite directions. A gear assembly translates rotation of the drive shaft to the ball nut. A ball screw extends along a longitudinal axis and has a terminal end operatively connectable to the flap. The ball screw is movable between a first retracted in response to rotation of the ball nut in a first direction and a second extended position in response to rotation of the ball nut in a second direction. A one-way roller clutch is operatively connectable to the ball nut. The roller clutch engages the housing and prevents rotation of the ball nut in a first direction in response to a compressive force on the ball screw by the flap. First and second concentric gimbals are positioned about the longitudinal axis adjacent the housing. A first pin extends through the first and second gimbals and being operatively connected to the housing.

A second pin may also extend through the first and second gimbals and being operatively connected to the housing and a mounting arrangement is provided for interconnecting the first gimbal to the wing. It is contemplated for the first and second gimbals to have a generally rectangular configuration.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
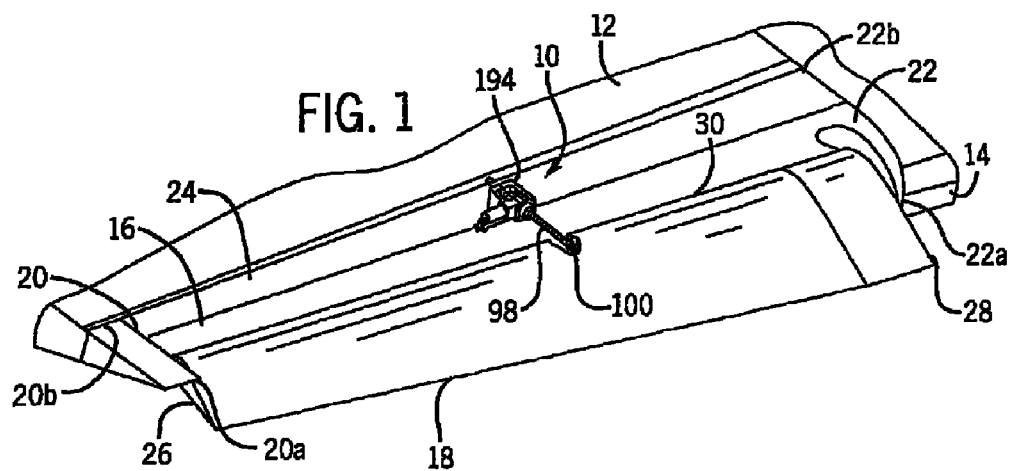
FIG. 1 is an isometric view of a flap actuator in accordance with the present invention mounted on a wing of a conventional aircraft.
Figure 2:
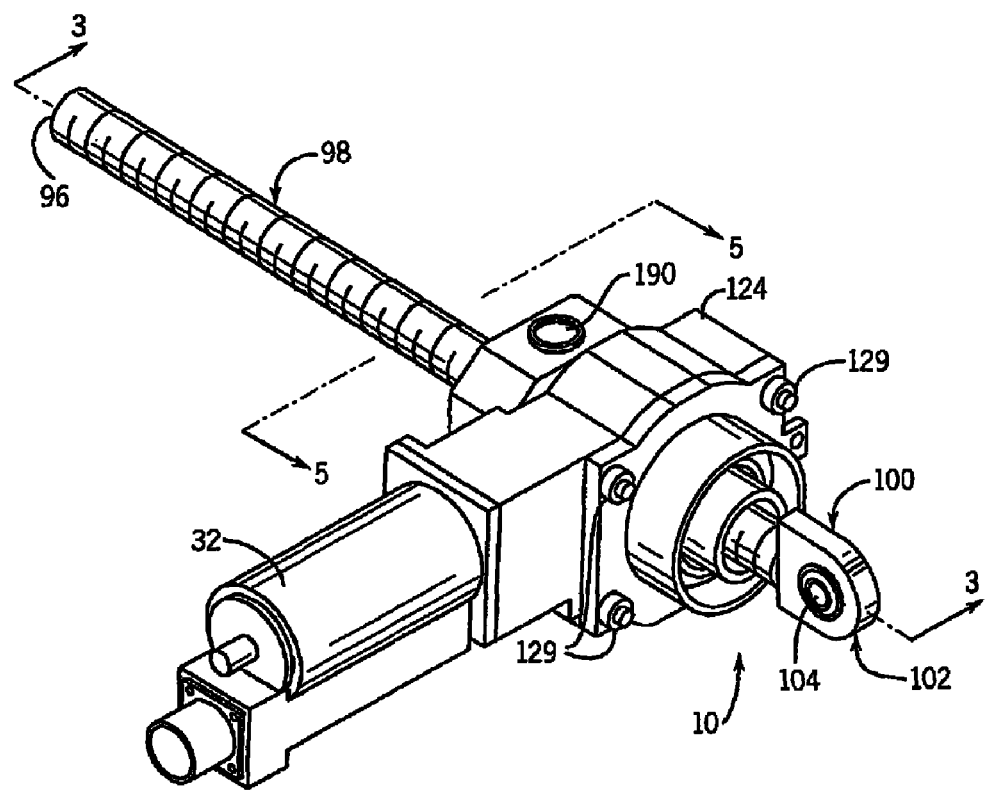
FIG. 2 is an isometric view of the flap actuator of the present invention.

Referring to FIGS. 1-2, a flap actuator in accordance with the present invention is generally designated by the reference numeral 10. As is conventional, an aircraft includes wing 12 projecting laterally from the fuselage (not shown). Wing 12 includes a forward end and a trailing end 14. Trailing end 14 of flap 18 includes flap receiving recess 16 formed therein for receiving flap 18. Flap receiving recess 16 in trailing end 14 of wing 12 is defined by first and second generally parallel sides 20 and 22, respectively. Trailing ends 20a and 22a of corresponding sides 20 and 22, respectively, intersect trailing edge 14 of wing 12. Leading ends 20b and 22b of corresponding first and second sides 20 and 22, respectively, intersect frame member 24 of wing 12. Frame member 24 projects laterally from and is operatively connected to the fuselage of the aircraft.

Flap 18 includes first side 26 pivotably connected to side 20 of wing 12 and second side 28 pivotably connected to side 22 of wing 12. As is conventional, flap 18 is pivotable about a longitudinal axis adjacent to and parallel to the leading edge 30 of flap 18 and movable between an extended and a retraction position. Flap actuator 10 interconnects flap 18 adjacent the leading edge 30 thereof to frame member 24 of wing 12 in order to control movement of flap 18.

Flap actuator 10 includes a brushless DC motor 32 rigidly connected to housing 124 in any suitable manner such as bolts or the like. Motor 32 is electrically coupled to a controller for receiving electrical power and converting the same into mechanical power. Motor 32 includes a drive shaft (not shown) rotatable in first and second directions in accordance with instructions received from the controller. It is intended that the mechanical power generated by motor 32 be transmitted to ball screw 98 through spur gear assembly 36, for reasons hereinafter described. It is noted that in the drawings, flap actuator 10 is orientated such that motor 32 projects away from the fuselage of the aircraft. It can be appreciated that flap actuator 10 may be orientated such that motor 32 projects toward the fuselage of the aircraft without deviating from the scope of the present invention.

Figure 4:
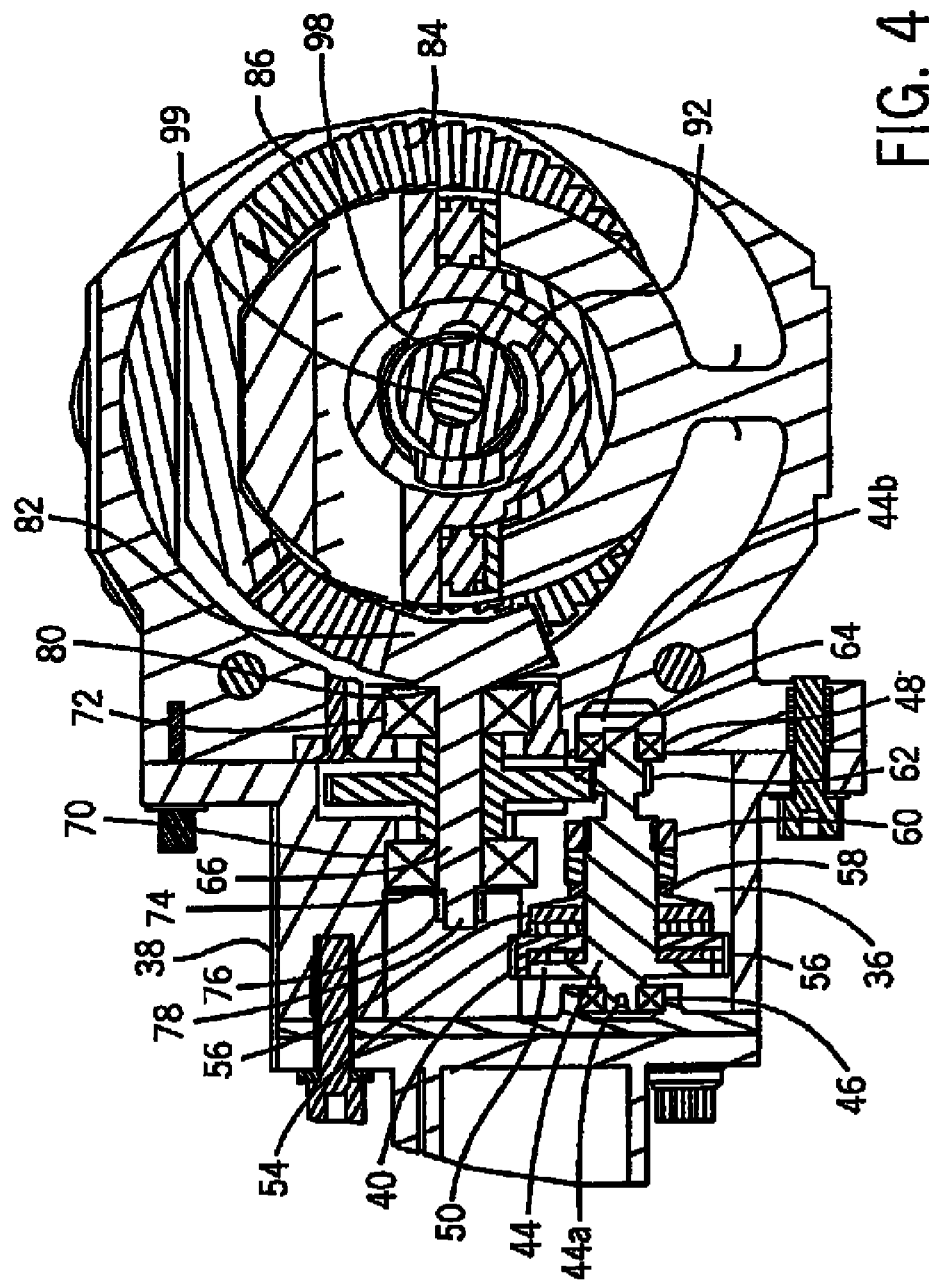
FIG. 4 is a cross-sectional view of a flap actuator of the present invention taken along line 4-4 of FIG. 3.

Referring to FIG. 4, spur gear assembly 36 includes clutch gear 40 mounted on clutch shaft 44 extending along a longitudinal axis. Clutch shaft 44 includes a first end 44a rotatably supported by bearing cage 46 and a second opposite end 44b supporting by bearing cage 48. Clutch shaft 44 further includes clutch plate 50 projecting radially from a location adjacent first end 44a. A first set of roller bearings 52 are captured between clutch plate 50 and a first side of clutch gear 40. A second set of roller bearings 54 are captured between a second side of clutch gear 40 and a first side of thrust plate 56 which extends about clutch shaft 44. Belleville spring 58 is captured between a second side of thrust plate 56 and adjustment nut 60 threaded onto clutch shaft 44. Pinion 62 projects radially from clutch shaft 44 adjacent second end 44b thereof.

When assembled, it is intended for belleville spring 58 to compress thrust plate 56, first and second roller bearings 52 and 54, respectively, and clutch gear 40 against clutch plate 50 so as to translate rotation (or more precisely, power) of clutch gear 40 to clutch shaft 44 under normal operating positions. In operation, the outer surface of drive shaft of motor 32 meshes with and drives clutch gear 40 in a user desired direction. If the torque generated on clutch gear 40 is below a predetermined threshold, rotation of clutch gear 40 is translated to clutch shaft 44. In the event that the torque on clutch gear 40 extends a predetermined threshold (e.g., if a downstream component of flap actuator 10 is locked in position), clutch gear 40 slips on clutch shaft 44 such that rotation of clutch gear 40 is not translated to clutch shaft 44. The torque threshold may be adjusted by varying the spring force generated by belleville spring 58 on thrust plate 56 via adjustment nut 60.

Pinnion 62 meshes with and drives spur gear 64. Inner diameter of spur gear 64 is keyed to the outer diameter of bevel shaft 66. Bevel shaft 66 is rotatably supported by first and second bearing cages 70 and 72, respectively. Washer 74 and nut 76 combination are mounted on first end 78 of bevel shaft 66 to maintain first and second bearing cages 70 and 72, respectively, and spur gear 64 thereon. Second end 80 of bevel shaft 76 includes enlarged bevel pinion 82 projecting therefrom. Bevel pinion 82 meshes with teeth 84 of bevel gear 86 in order to translate rotation of bevel pinion 82 to bevel gear 86.

Figure 3:
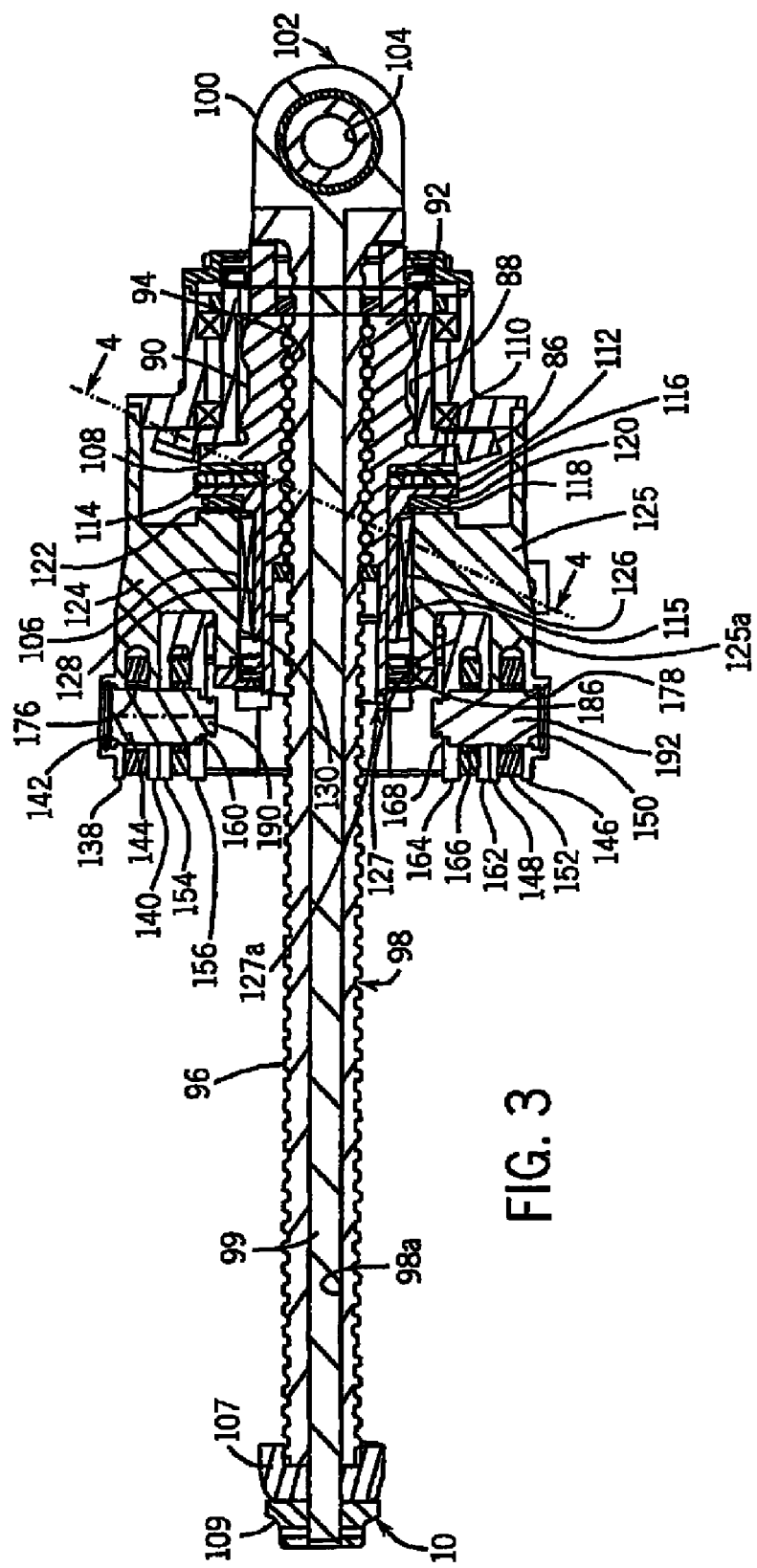
FIG. 3 is a cross-sectional view of the flap actuator of the present invention taken along line 3-3 of FIG. 2.

Referring to FIG. 3, bevel gear 86 has a splined inner surface 88 that meshes with outer surface 90 of ball nut 92. Threads 94 along the inner diameter of ball nut 90 mesh with threads 96 along the outer surface of ball screw 98 for reasons hereinafter described. Ball screw 98 further includes central passageway 98a adapted for receiving inner rod 99 therethrough. It is intended for inner rod 99 to maintain the integrity of ball screw 98 in the event of a fracture of ball screw 98. Inner rod 99, and hence ball screw 98, extends along a longitudinal axis and includes enlarged head 100 on a first end 102 thereof. Reinforced aperture 104 extends through head 200 of ball screw 98. As best seen in FIG. 1, head 100 of ball screw 98 is interconnected to wing 18 adjacent leading edge 30 thereof through aperture 104. Second end 105 of inner rod 99 includes a seal 107 and nut 109 combination secured thereon for maintaining ball screw 98 on inner rod 99 and preventing unwanted material from entering the central passageway 98a.

In order to prevent axial movement (from right to left in FIG. 3) of ball screw 98 under pressure of a compressive load on the surfaces of flap 18, and hence movement of flap 18 during operation of an aircraft, no-back assembly 106 is provided. No-back assembly 106 includes trailing thrust plate 108 and is positioned against shoulder 110 projecting radially from ball nut 92. Skewed roller 112 is positioned between trailing thrust plate 108 and leading thrust plate 114. Leading thrust plate 114 is generally tubular and includes an inner diameter about the outer periphery of ball nut 92 and plate element 116 projecting radially from a first end thereof. Thrust washer 118 and thrust bearing 120 are positioned between support surface 122 of housing 124 and plate element 116 of thrust plate 114. One-way roller clutch 126 is disposed between outer surface 128 of thrust plate 114 and inner surface 130 of housing 124.

Roller clutch 126 only allows rotation of thrust plate 114 in a single direction, e.g., clockwise. As such, with ball screw under a compressive load, thrust plate 108 engages skewed roller 112 and urges skewed roller against thrust bearing 120. Due to the friction developed between ball nut flange 110, thrust plate 108, skewed roller 112 and thrust plate 114, clutch roller 126 prevents further rotation of ball screw 98 in the clockwise direction.

Figure 5:
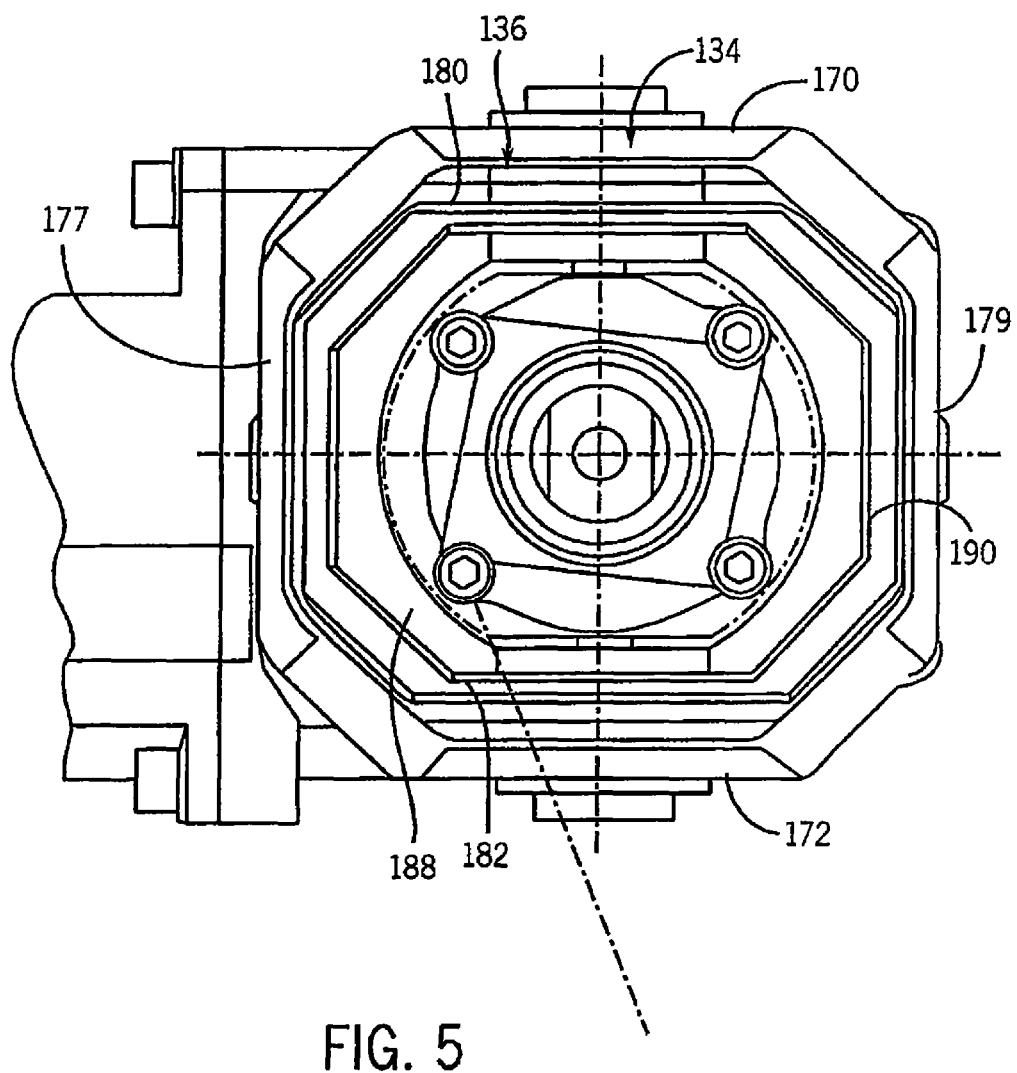
FIG. 5 is a cross-sectional view of a flap actuator of the present invention taken along line 5-5 of FIG. 2.

Housing 124 is interconnected to frame element 124 of wing 12 by primary and secondary gimbals 134 and 136, respectively, FIG. 5. As best seen in FIG. 3, it is contemplated for housing 124 to include main portion 125 and secondary portion 127 attached thereto by a plurality of through bolts 129, FIG. 2. Housing 124 includes spaced upper primary gimbal mounting tabs 138 and 140, respectively, projecting from leading end 125a of main portion 125 of housing 124. Upper primary gimbal mounting tabs 138 and 140, respectively, are generally U-shaped and include corresponding apertures 142 and 144, respectively, therethrough. Spaced lower primary gimbal mounting tabs 146 and 148, respectively, project from leading end 125a of main portion 125 of housing 124. Lower primary gimbal mounting tabs 146 and 184 are generally U-shaped and include corresponding apertures 150 and 152, respectively therethrough. Apertures 142 and 144 through upper primary gimbal mounting tabs 138 and 140, respectively, are axially aligned with apertures 150 and 152 though corresponding lower primary gimbal mounting tabs 146 and 148, respectively, for reasons hereinafter described.

Housing 124 further includes spaced upper secondary gimbal mounting tabs 154 and 156, respectively, extending from leading end 127a of secondary portion 127 of housing 124. Upper secondary gimbal mounting tabs 154 and 156 are generally U-shaped and include corresponding apertures 158 and 160, respectively, therethrough. Spaced lower secondary gimbal mounting tabs 162 and 164, respectively, project from leading end 127a of secondary portion 127 of housing 124. Lower secondary gimbal mounting tabs 162 and 164 are generally U-shaped and include corresponding apertures 166 and 168, respectively, therethrough. Apertures 158 and 160 through upper secondary gimbal mounting tabs 154 and 156, respectively, and apertures 166 and 168 through lower secondary gimbal mounting tabs 162 and 164, respectively, are axially aligned with each other and with apertures 142, 144, 150 and 152.

Referring back to FIG. 5, primary gimbal 134 has a generally square configuration and is defined by upper and lower walls 170 and 172, respectively having apertures 176 and 178, respectively, therethrough. Primary gimbal 134 is further defined by first and second sidewalls 177 and 179, respectively, having corresponding apertures (not shown) therethrough, for reasons hereinafter described.

Secondary gimbal 136 also has a square-like configuration and includes upper and lower walls 180 and 182, respectively. Upper and lower walls 180 and 182, respectively, of secondary gimbal 136 include corresponding apertures 184 and 186, respectively therethrough. In addition, secondary gimbal 136 is defined by first and second sidewalls 188 and 190, respectively, having corresponding apertures (not shown) therethrough.

In order to mount housing 124 to wing 12, upper gimbal 134 is positioned such that upper wall 170 of primary gimbal 134 is received between upper primary gimbal mounting tabs 138 and 140 and such that lower wall 172 of primary gimbal 134 is received between lower primary gimbal mounting tabs 146 and 148. In addition, aperture 176 through upper wall 170 of primary gimbal 134 is axially aligned with apertures 142 and 144 through upper primary gimbal mounting tabs 138 and 140, respectively, and such that aperture 178 through lower wall 172 of primary gimbal 134 is axially aligned with apertures 150 and 152 through primary gimbal mounting tabs 146 and 148, respectively.

Secondary gimbal 136 is positioned such that upper wall 180 of secondary gimbal 136 is received between upper secondary gimbal mounting tabs 154 and 156 and such that lower wall 182 of secondary gimbal 136 is received between lower secondary gimbal mounting tabs 146 and 148. Aperture 184 through upper wall 180 of secondary gimbal 136 is axially aligned with apertures 158 and 160 through upper secondary gimbal mounting tabs 154 and 156, respectively, and aperture 186 through lower wall 182 of secondary gimbal 136 is axially aligned with apertures 166 and 168 through lower secondary gimbal mounting tabs 162 and 164, respectively.

Once primary and secondary gimbals 134 and 136, respectively, are positioned as heretofore described, upper pin 190 is inserted through aperture 142 in upper primary gimbal mounting tab 138; aperture 176 through upper wall 170 of primary gimbal 134; aperture 144 through upper primary gimbal mounting tab 140; aperture 158 through upper secondary gimbal mounting tab 154; aperture 184 through upper wall 180 of secondary gimbal 136; and aperture 160 through upper secondary gimbal mounting tab 156. In addition, pin 192 is inserted through aperture 150 in lower primary gimbal mounting tab 146; aperture 178 through lower wall 172 of primary gimbal 134; aperture 152 through lower primary gimbal mounting tab 148; aperture 166 through lower secondary gimbal mounting tab 162; aperture 186 through lower wall 182 of secondary gimbal 136; and through aperture 168 through lower secondary gimbal mounting tab 164. Thereafter, primary gimbal 134 is positioned within mounting bracket 194 projecting in a trailing direction from frame element 24 of wing 12. Spherical bearings incorporating a mounting pin are seated in the aperture in sidewall 177 of primary gimbal 134 and in the aperture in sidewall 188 of secondary gimbal 136 to rigidly connect flap actuator 10 to mounting bracket 194. Similarly, spherical bearings incorporating a mounting pin are seated in the aperture in sidewall 179 of primary gimbal 134 and in the aperture in sidewall 190 of secondary gimbal 136 to rigidly connect flap actuator 10 to bracket 194.

In operation, a controller, responsive to pilot control, actuates motor 32 so as to rotate the drive shaft in a user desired direction. Spur gear assembly 36 translates rotation of the drive shaft to bevel gear 86 which, in turn, rotates ball nut 92 about the longitudinal axis of inner rod 99. Rotation of ball nut 92 is translated to ball screw 98 which, in turn, moves linearly along the longitudinal axis of inner rod 99. By way of example, rotation of ball nut 92 in a clockwise direction causes ball screw 98 to move in a first linear direction and rotation of ball nut 92 in a counterclockwise direction causes ball screw 98 to move in a second opposite linear direction. In such manner, ball screw 98 may be moved from an extended position to a retracted position, thereby allowing the position of flap 10 to be adjusted.

During operation of the aircraft, a compressive force (from right to left in FIG. 3) may be provided on first end 102 of inner rod 99 and on ball screw 98 by flap 18. This compressive force is translated through no-back assembly 106, as heretofore described, to housing 124. Thereafter, the compressive load is translated through pins 190 and 192 to primary and second gimbals 134 and 136, respectively, and though the spherical bearings of the primary and second gimbals 134 and 136, respectively, to wing 18. It can be appreciated that the arrangement of flap actuator 10 provides redundant load sharing of any compressive force generated by a load on flap 18. For example, the load may be translated solely by ball screw 98 if inner rod 99 is disabled and visa-versa. Similarly, the load may be translated solely by secondary portion 127 of housing 124 if main portion 125 of housing 124 is disabled and visa-versa or the load may be translated solely by secondary gimbal 136 if primary gimbal 134 is disabled or visa-versa.

Various modes of carrying out the invention are contemplated as being within the scope of the following claims particularly pointing out and distinctly claiming the subject matter that is regarded as the invention.

We claim:

1. A flap actuator for controlling movement of a flap on a wing of an aircraft, comprising:
   a housing having a leading end and a trailing end;
   a ball nut rotatably supported in the housing;
   a motor having a rotatable drive shaft, the drive shaft rotatable in first and second opposite directions; and
   a gear assembly for translating rotation of the drive shaft to the ball nut;
   a ball screw extending along a longitudinal axis and having a terminal end operatively connectable to the flap, the ball screw movable between a first retracted position response to rotation of the ball nut in a first direction and a second extended position in response to rotation of the ball nut in a second direction;
   a one-way roller clutch operatively connectable to the ball nut, the roller clutch engaging the housing and preventing rotation of the ball nut in a first direction in response to a compressive force on the ball screw by the flap;
   first and second concentric gimbals positioned about the longitudinal axis adjacent the housing; and
   a first pin extending through the first and second gimbals and being operatively connected to the housing.

2. The flap actuator of claim 1 further comprising a second pin extending through the first and second gimbals and being operatively connected to the housing.

3. The flap actuator of claim 2 further comprising a mounting arrangement for interconnecting the first gimbal to the wing.

4. The flap actuator of claim 1 wherein the first and second gimbals have a generally rectangular configuration.

5. The flap actuator of claim 1 wherein:
   the housing includes a main portion and a secondary portion;
   the first pin operatively connects the first gimbal to the main portion of the housing; and
   the first pin operatively connects the second gimbal to the secondary portion of the housing.

* * * * *